(12) United States Patent
Norris

(10) Patent No.: US 6,474,581 B2
(45) Date of Patent: Nov. 5, 2002

(54) FISHING REEL

(75) Inventor: Charlie Norris, Northumberland (GB)

(73) Assignee: House of Hardy Ltd. (GB)

( * ) Notice: Subject to any disclaimer, the term of this patent is extended or adjusted under 35 U.S.C. 154(b) by 0 days.

(21) Appl. No.: 09/893,183

(22) Filed: Jun. 26, 2001

(65) Prior Publication Data

US 2002/0020772 A1 Feb. 21, 2002

(30) Foreign Application Priority Data

Jun. 28, 2000 (GB) ................................................ 0015811

(51) Int. Cl.$^7$ ................................................. A01K 89/02
(52) U.S. Cl. ................................... 242/296; 242/317
(58) Field of Search .............................. 242/317, 318, 242/295, 307, 245, 246

(56) References Cited

U.S. PATENT DOCUMENTS

| | | | | |
|---|---|---|---|---|
| 4,352,474 A | * | 10/1982 | Kovalovsky | 242/318 |
| 4,461,435 A | | 7/1984 | Kovalovsky | |
| 4,515,325 A | * | 5/1985 | Ito | 242/318 |
| 4,966,336 A | * | 10/1990 | Humble et al. | 242/317 |
| 5,199,682 A | | 4/1993 | James | |
| 5,556,049 A | * | 9/1996 | Bennett et al. | 242/318 |
| 5,918,826 A | * | 7/1999 | Arkowski | 242/317 |
| 5,947,398 A | * | 9/1999 | Yeh | 242/295 |
| 6,010,087 A | * | 1/2000 | Merrill et al. | 242/318 |
| 6,155,508 A | * | 12/2000 | Legape | 242/318 |

FOREIGN PATENT DOCUMENTS

| | | |
|---|---|---|
| GB | 1493621 | 11/1977 |
| GB | 2125262 A | 3/1984 |
| GB | 2203211 A | 10/1988 |
| GB | 0015811.3 | 11/2000 |
| GB | 0015811.3 | 9/2001 |

* cited by examiner

*Primary Examiner*—Emmanuel Marcelo
(74) *Attorney, Agent, or Firm*—Brinks Hofer Gilson & Lione; Daniel B. Schein, Esq.

(57) ABSTRACT

A fishing reel comprising a spool releasably secured by a locking nut on a spindle of a spool carrier, a ratchet mechanism engageable through a friction plate assembly being adapted to allow the spool to rotate relatively freely in a first direction and adapted to impart resistance or prevent rotation in the reverse direction, the friction plate assembly being operable by rotation of the locking nut to control the resistance to rotation in the reverse direction, the ratchet mechanism comprising a reversible pawl on the carrier and a circular ratchet mounted on the spindle of the carrier for coaxial rotation relative to the spindle, the pawl being moveable by means of a switch between a first position to prevent rotation of the ratchet in the forward direction and a second position to prevent rotation of the ratchet in the reverse direction.

8 Claims, 5 Drawing Sheets

FISHING REEL

FIELD OF THE INVENTION & BACKGROUND

This invention relates to a fishing reel of the kind comprising a rotatable line spool mounted on a spool carrier, the carrier usually being attached to the fishing rod by means of a saddle. Such reels often incorporate a drag or break mechanism which allows the spool to rotate relatively freely in a first direction but which imparts resistance to rotation in the opposite direction. The drag mechanism may comprise a ratchet and pawl arrangement coupled to the carrier by means of a friction plate assembly. In the first direction of rotation the pawl or pawls trip without effect over the ratchet but in the opposite direction the pawl engages the ratchet so that the spool and one of the friction plates rotate in unison thereby imparting drag to the motion of the spool.

The friction plate assembly is generally adjustable to vary the amount of resistance applied. The assembly may incorporate a rotatable knob to apply variable pressure to the friction plates.

Drag reels may be manufactured for either right handed or left handed use. A reel fitting mounted in conventional manner beneath a rod for fly fishing, would have the drag mechanism arranged to resist rotation of the spool as the line is pulled from the spool through the rod rings. Most reels are manufactured for left handed winding of the spool while the rod is held in the right hand, i.e., for right-handed use. However it is desirable that a reel can be altered to allow left-handed use. There are two main types of disc drag fishing reels. A first type is a quick release spool. An example is the Hardy Sovereign 2000. This design incorporates a drag system and adjusting method on the spool carrier to facilitate removal of the drum from the system. However this arrangement requires many moving parts and generally makes it necessary for the drag to be set to match the spool because of the tolerance build up on the small components. A second type of drag system is one in which the drag system and adjustment are partly located in the spool and partly on the spool carrier. This has an advantage of fewer moving parts and does not facilitate quick release of the spool during use, as there is usually a slotted screw or hexagon nut to prevent the adjustment button from falling off when unscrewing. This type of stop requires a screwdriver or spanner to facilitate removal of the stop, unscrewing the button and finally removal of the spool from the carrier.

GB-A-2228655 discloses a reversible drag reel, which may be converted from right-handed to left-handed use and vice versa. This reel comprises a circular ratchet mounted on the carrier and three concentric pawls mounted on the spool. The pawls are each reversible by rotation of an annular slide ring. Three pawls are necessary in order to keep the spool concentric upon the spindle during use.

SUMMARY AND DETAILED DESCRIPTION OF THE INVENTION

An embodiment of the present invention is a fishing reel, comprising a spool releasably secured by a locking nut on a spindle of a spool carrier, a ratchet mechanism engageable through a friction plate assembly being adapted to allow the spool to rotate relatively freely in a first direction and adapted to impart resistance or prevent rotation in the reverse direction, the friction plate assembly being operable by rotation of the locking nut to control the resistance to rotation in the reverse direction, the ratchet mechanism comprising a reversible pawl on the carrier and a circular ratchet mounted on the spindle of the carrier for coaxial rotation relative to the spindle, the pawl being moveable by means of a switch between a first position to prevent rotation of the ratchet in the forward direction and a second position to prevent rotation of the ratchet in the reverse direction. A single pawl is preferred.

Location of the ratchet and pawl assembly on the spool casing allows the spool to rotate freely without being impeded by radial forces applied by the ratchet assembly. A single reversible pawl affords a simple lightweight construction with fewer moving parts. The need for an annular ring is avoided. This allows the spool and casing to have a perforated lightweight construction without the perforations being obscured by the ring and mounting assembly for the pawls. Furthermore it is not necessary for the pawl assembly to occupy the line storage volume of the spool.

The reel of the present invention avoids the need for an externally placed adjuster stop and therefore facilitates quick release of the spool when using a drag system in which the adjustment method is partly on the spool and partly on the spool carrier. The present invention also confers the advantage that wider tolerance components can be used. Assembly is also facilitated without need for cutting and setting of components.

The pawl preferably comprises a curved bar or member having a ratchet engaging tooth at either end and is pivotable about a central pivot. The switch preferably comprises a toggle slideable in a linear direction between "left" and "right" positions to reverse the ratchet mechanism. A spring carried by the toggle bears on the bar in an over centre arrangement to urge one of the teeth of the bar or member into engagement with the circular ratchet.

The friction plate assembly may comprise a pair of friction plates, a first plate being carried by the spool and the other plate being carried upon the ratchet wheel. Tightening of the locking nut urges the plates together engaging the ratchet mechanism to the spool. Partial engagement of the clutch allows the spool to rotate with a variable degree of friction. Full engagement prevents the spool from rotation against the ratchet.

In a second aspect of the invention a fishing reel comprises a spool releasably secured by a locking nut on a spindle of a spool carrier, a ratchet mechanism engageable through a friction plate assembly being adapted to allow the spool to rotate relatively freely in a first direction and adapted to impart resistance or prevent rotation in the reverse direction, the friction plate assembly being operable by rotation of the locking nut to control resistance to rotation in the reverse direction, the locking nut including a stop and the carrier including two abutments, the stop engaging a first abutment in a first setting of the assembly and being moveable to engagement with the second abutment in a second position of the assembly, the stop comprising a moveable member moveable between open and closed positions wherein in the closed position the stop can engage one of said abutments and wherein in the open position the stop does not engage an abutment when the knob is rotated, allowing the knob to be unscrewed from the spindle. This arrangement provides a convenient method of locking the nut onto the spindle, preventing the nut from becoming unscrewed as the tension of the clutch is adjusted.

The moveable member may be biased by a spring into the closed position. In a preferred embodiment the moveable member comprises a peg having an actuation knob extending from the outer face of the locking nut.

In preferred embodiments of the invention the location of the first and second abutments on the carrier can be moved to adjust the range of drag settings of the friction plate assembly. This alters the range within which the friction applied can be adjusted by rotation of the locking nut in use. In a preferred embodiment of the invention the abutment comprises a screw that can be received in one of a multiplicity of threaded bores arranged in a circular array around the axis of the spindle. Opposite sides of the screw head may provide the first and second abutments.

The invention is further described by means of example but not in any limitative sense with reference to the accompanying drawings of which:

The same reference numerals are used to denote the same components in each of the Figures.

Figure 1:
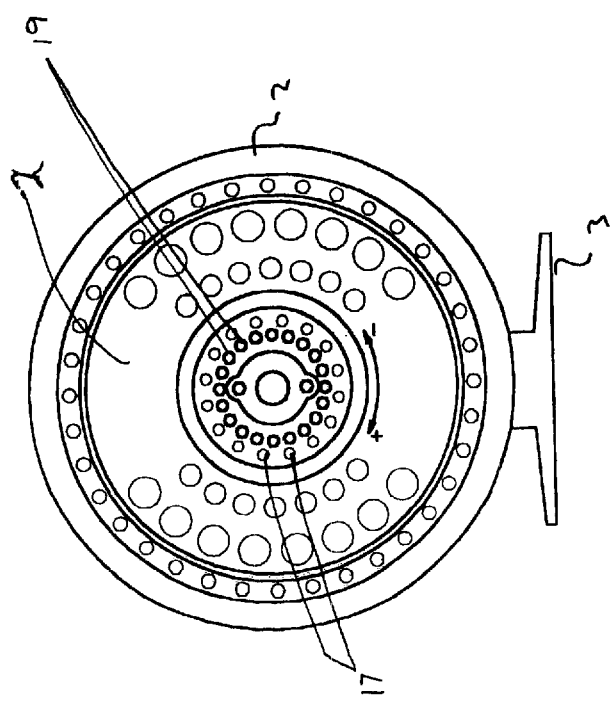
FIG. 1 is a front elevation of a reel in accordance with this invention with the locking nuts removed.

The reel shown in the Figures comprises a spool 1 mounted on a spool carrier 2. A saddle 3 extending from the carrier serves to permit mounting upon a rod in conventional manner. The spool 1 includes a handle 4 and counterweight 21 to permit manual winding of the spool.

The spool is mounted on a spindle 5 extending axially of the spool carrier 2. The spindle 5 is hollow and a retaining pin 13 mounted on the outer face of the spool extends through the spindle 5. The retaining pin 13 has a threaded portion 22 at the end onto which a locking nut 6.

A circular ratchet 7 having symmetrical rectangular or otherwise shaped teeth 11, freely rotatable about the spindle 5 is retained on the spindle by an blastomeric retaining ring 8. A click ratchet 10 incorporating circumferential teeth 24 is disposed axially adjacent the ratchet 7 and is arranged to rotate integrally with the ratchet 7. A resilient ring 25 mounted on the inner face of the spool urges a moveable pawl 14 against the teeth 24 so that a clicking sound is generated as the spool rotates relative to the ratchet wheel.

The surface of the wheel 7, which faces towards the spool, carries a friction plate 127. A friction pad 26 on the corresponding face of the spool bears against the friction plate 127 as the locking nut 6 is tightened.

The friction pad 26 may be composed of woven carbon fibre or other hardwearing material. The friction plate 127 is preferably composed of hard anodised aluminium. This provides for a hard-wearing drag mechanism with reduced sticking properties during use.

Figure 2:
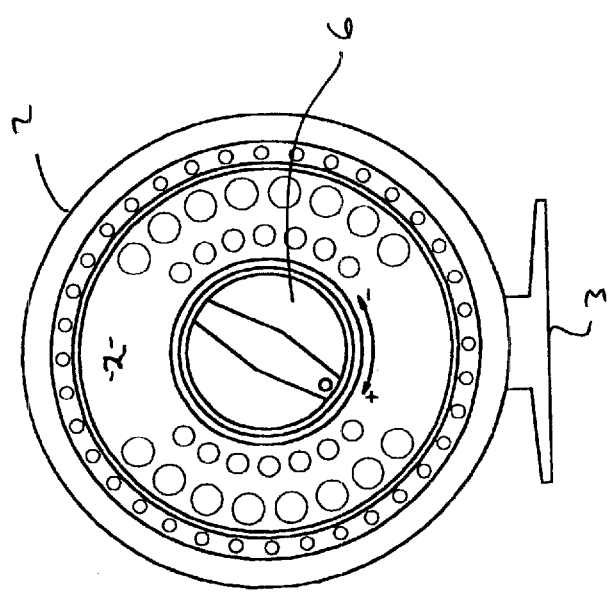
FIG. 2 shows the reel of FIG. 1 with the locking nut in place.
Figure 3:
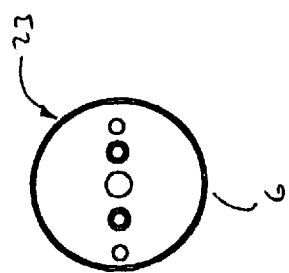
FIG. 3 shows the rear of the locking nut.
Figure 7:
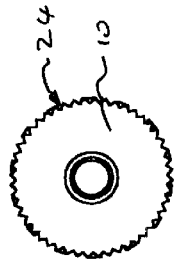
FIGS. 7 and 8 show the click and ratchet wheels.
Figure 8:
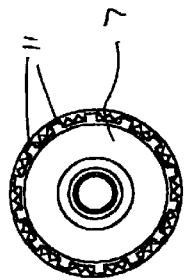
Figure 6:
FIG. 6 shows the washer.
Figure 5:
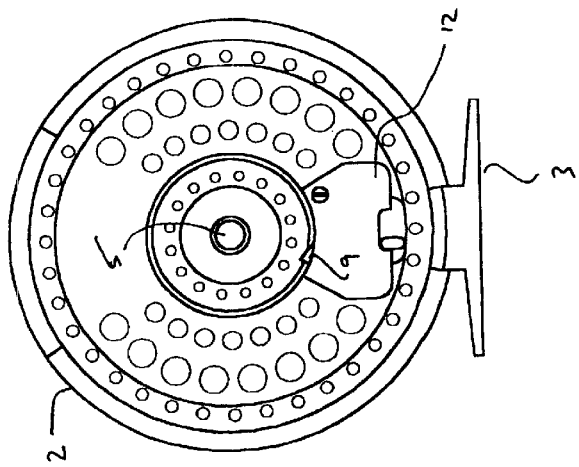
FIG. 5 shows the spool carrier of FIG. 4 with the circular ratchet removed.
Figure 4:
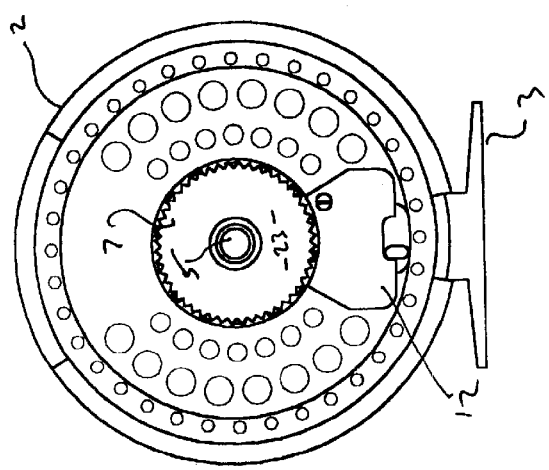
FIG. 4 shows the spool carrier of FIGS. 1 and 2 with the spool removed.
Figure 9:
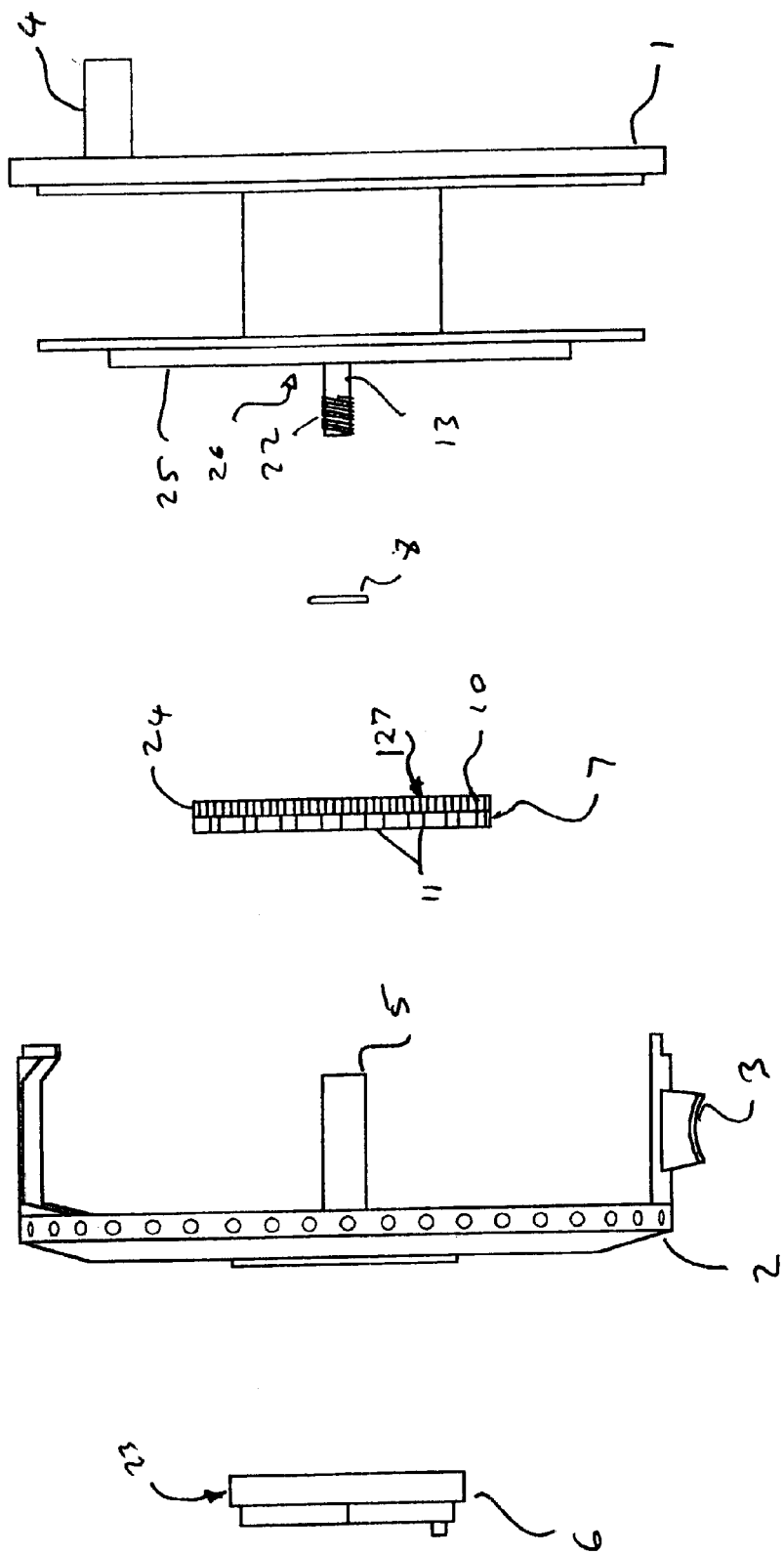
FIG. 9 is a side elevation of the dismantled reel.
Figure 10:
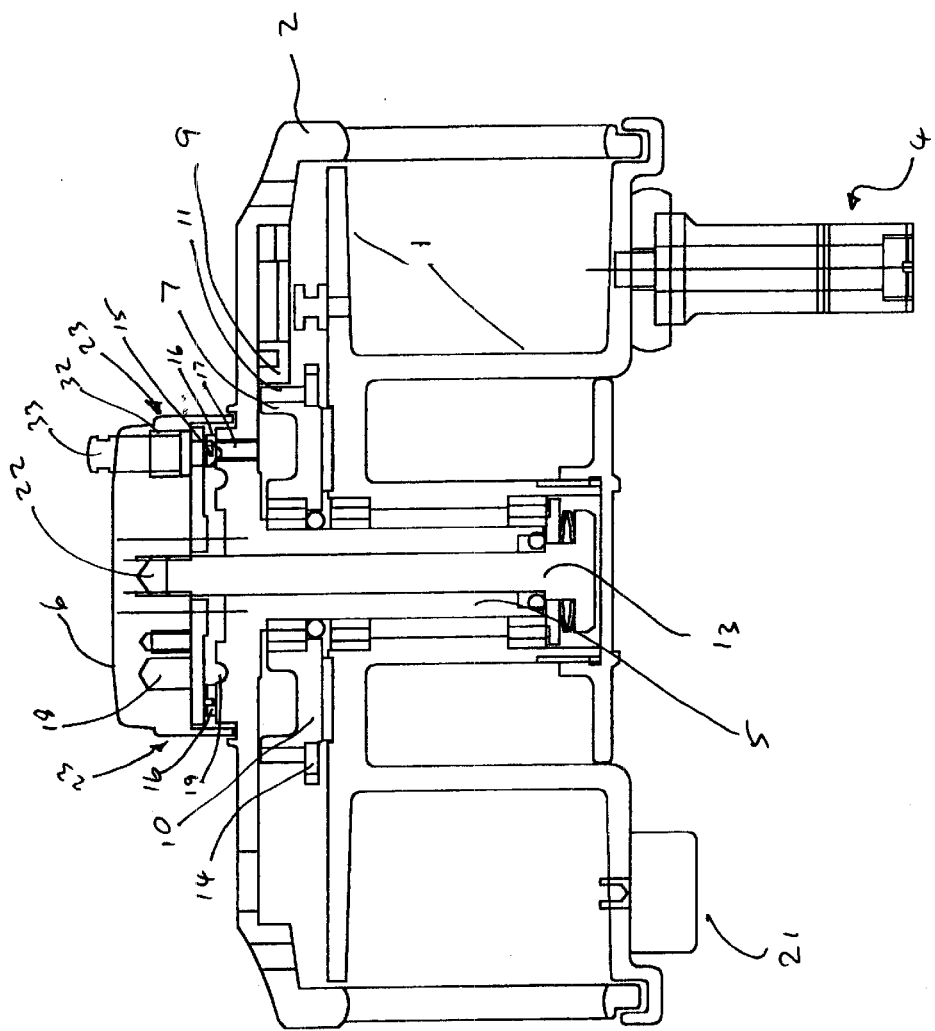
FIG. 10 is a cross-sectional view of the reel.

Rotation of the locking nut as shown by the symbols + and − in FIG. 2 increases or decreases the friction between the plate 127 and pad 26. When the nut 6 is tightened the ratchet 7 rotates with the spool. The teeth 11 cooperate with the moveable pawl 9 to constrain the spool rotation in one direction as described below.

Figure 11:
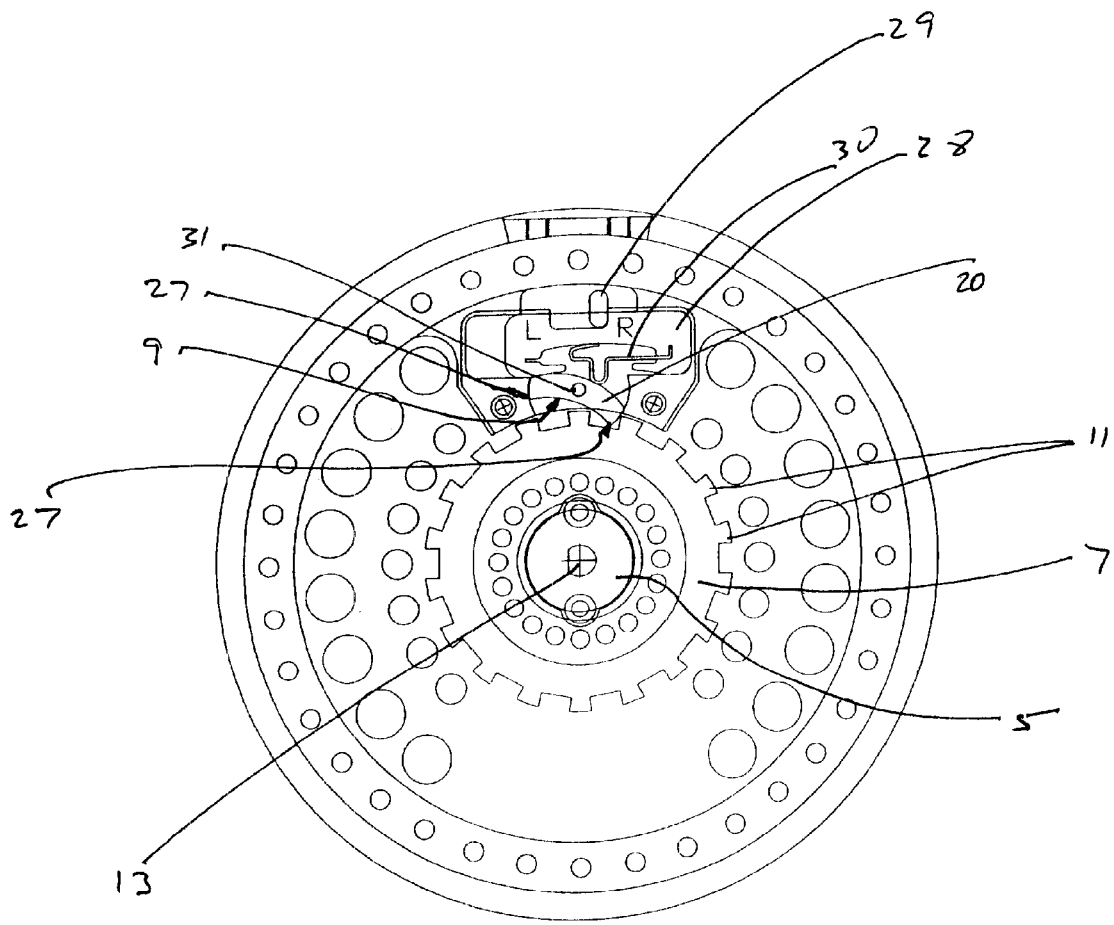
FIG. 11 is a detailed view showing the ratchet and reversible pawl.

The use of the reversible ratchet is described with reference to FIG. 11. A ratchet bar (or pawl) 20 mounted for pivotal movement on a pin 31 has downwardly extending teeth 27 which may engage corresponding teeth 11 on the ratchet wheel 7. The toggle bar 28 is constrained to move linearly in a tangential direction above the bar 20. A spring 30 carried by the bar 28 bears downwardly on the curved surface of the ratchet bar 20 so that the tangential movement of the toggle 28 reverses the ratchet in an over centre manner. An actuator switch 29 extends upwardly from the toggle 28 to facilitate manual engagement and actuation of the reversible ratchet mechanism. As shown in FIG. 11 the spool may rotate clockwise but is constrained from anticlockwise rotation by abutment between the ratchet teeth 11 and pawl teeth 27. Movement of the toggle 28 to the left reverses the pawl so that anticlockwise rotation of the wheel 7 is permitted but clockwise rotation is prevented. Tightening of the locking nut imposes a similar constraint on the rotation of the spool.

In use the reel may be switched from right handed to left handed use or vice versa simply by removing the spool from the carrier and actuation of the switch 29. Unscrewing of the pawl assembly is avoided.

The construction of the locking nut is described with particular reference to FIGS. 1 to 3 and 10.

The locking nut 6 comprises a generally cylindrical body having a knurled circumferential skirt 23. Rotation of the locking nut tightens or loosens the retaining pin 13.

A sprung pin received in a bore 18 extends into a circular array of recesses 19 on the face of the carrier 2. This arrangement causes the knob to click as it is rotated relative to the carrier.

A circular array of threaded bores 17 is located coaxially on the face of the carrier. A screw 16 received in one of the bores 17 serves to cooperate with a stop 15 mounted on the inner surface of the locking nut 6. The stop comprises a stud urged outwardly from the cap by a spring 32. A knob 33 extending from the top of the nut 6 allows the stop 15 to be withdrawn into the nut 6 preventing contact with the head of the screw 16 as the locking nut is rotated.

In use, the locking nut may be wound onto the thread 22 of the pin 13 until the stop 15 contacts the head of the screw 16. The knob 33 may be lifted, for example by a user's thumb nail, to withdraw the stop 15 allowing the locking nut to be further screwed onto the pin 13. Subsequently the locking nut may only rotate until the stop 15 engages the screw 16. Thus an almost complete rotation is permitted.

The range of degrees of drag afforded by friction between the plates 26 and 127 may be adjusted by moving the screw 16 to an alternative threaded bore 17.

The locking nut arrangement allows for quick removal of the spool from the carrier. The knob 33 can be lifted up and used to unscrew the knob from the thread 22. Similarly the locking nut may be quickly and easily replaced by engaging it on the thread 22, raising the knob 33 and winding until the friction plates engage.

I claim:

1. A fishing reel, comprising a spool releaseably secured by a locking nut on a spindle of a spool carrier, a ratchet mechanism engageable with said spool through a friction plate assembly, wherein said friction plate assembly allows said spool to rotate relatively freely in a firs direction and imparts resistance or prevents rotation in the reverse direction, said friction plate assembly being operable by rotation of said locking nut to control the resistance to rotation in the reverse direction, said ratchet mechanism comprising a reversible pawl mounted on said spool carrier and a circular ratchet mounted on said spindle of said spool carrier for coaxial rotation relative to said spindle, said pawl being moveable by means of a switch between a first position to prevent rotation of said ratchet in the forward direction and a second position to prevent rotation of said ratchet in the reverse direction.

2. The fishing reel of claim 1, comprising a single pawl.

3. The fishing reel of claim 1, wherein said pawl comprises a curved member having a ratchet engaging tooth at either end pivotable about a central pivot.

4. The fishing reel of claim 1, wherein said switch comprises a toggle slidable in a linear direction to reverse said ratchet mechanism.

5. The fishing reel of claim 1, wherein said friction plate assembly comprises a pair of friction plates, wherein a first plate is carried by said spool and a second plate is carried upon said circular ratchet.

6. A fishing reel, comprising a spool releasably secured by a locking nut on a spindle of a spool carrier, a ratchet mechanism engageable with said spool through a friction plate assembly, wherein said friction plate assembly allows said spool to rotate relatively freely in a first direction and imparts resistance or prevents rotation in the reverse direction, said friction plate assembly being operable by rotation of said locking nut to control resistance to rotation in the reverse direction, said locking nut including a stop and said carrier including two abutments, said stop engaging a first abutment in a first setting of said friction plate assembly and being moveable to engagement with a second abutment in a second position of said friction plate assembly, said stop comprising a moveable member moveable between open and closed positions, wherein in the closed position said stop can engage one of said abutments and wherein in the open position the stop does not engage an abutment when the knob is rotated, allowing the knob to be unscrewed from the spindle.

7. The fishing reel of claim 6, wherein the location of said first and second abutments on said carrier can be moved to adjust the range of drag provided by said friction plate assembly.

8. The fishing reel of claim 7, wherein at least one of said abutments comprises a screw adapted to be received in one of a multiplicity of threaded bores arranged in a circular array around the axis of said spindle.

* * * * *